United States Patent Office 3,428,085
Patented Feb. 18, 1969

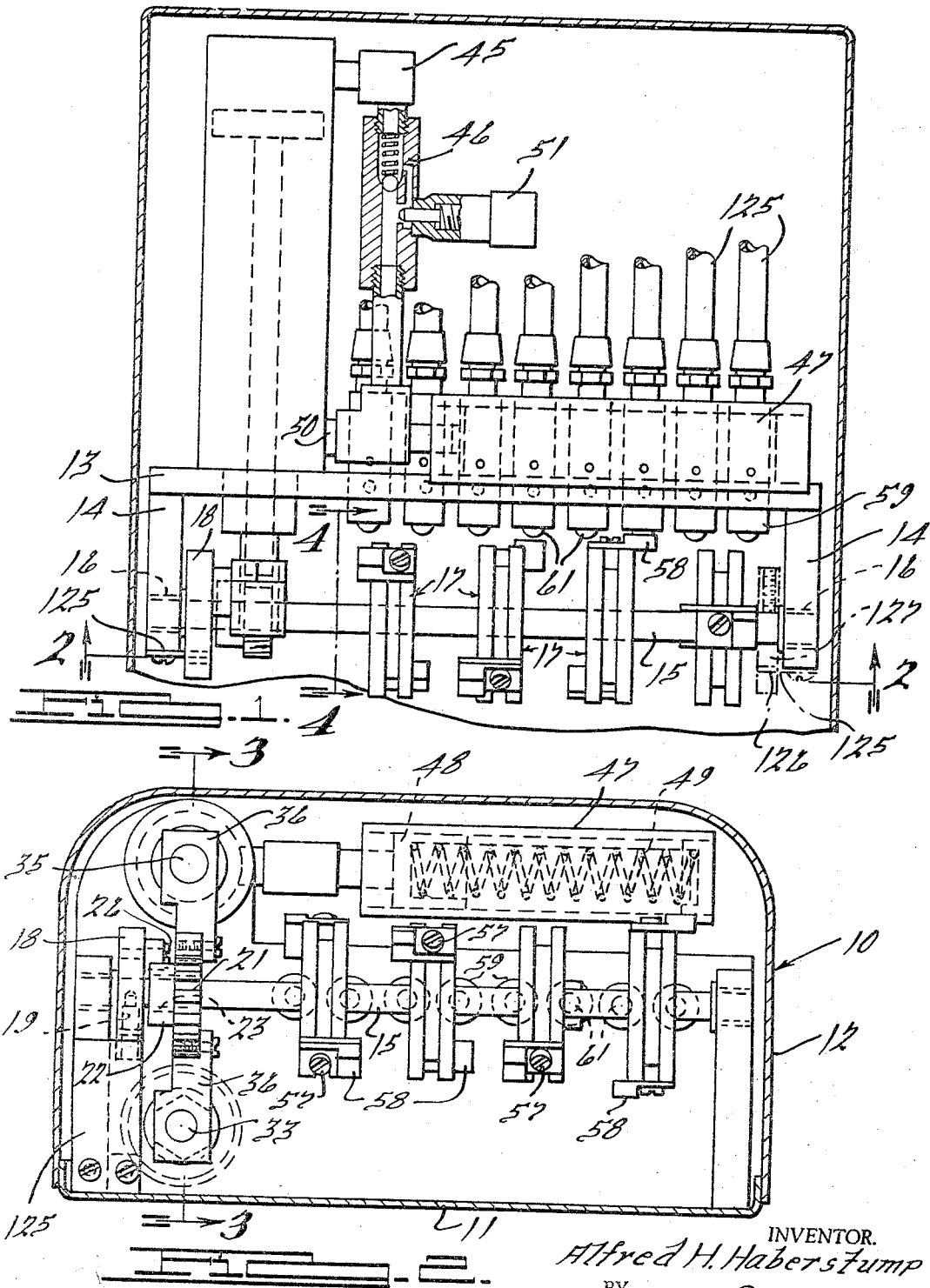

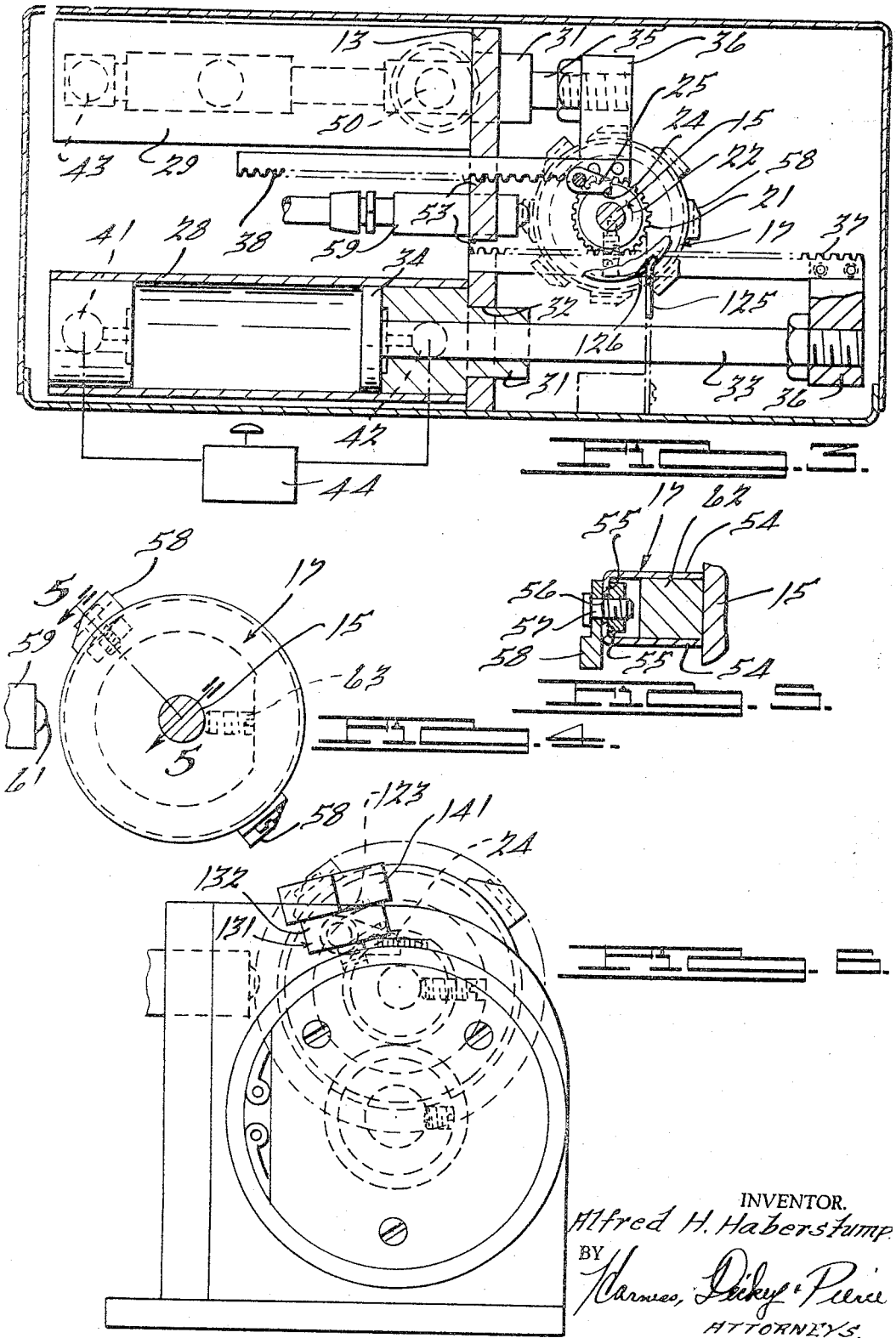

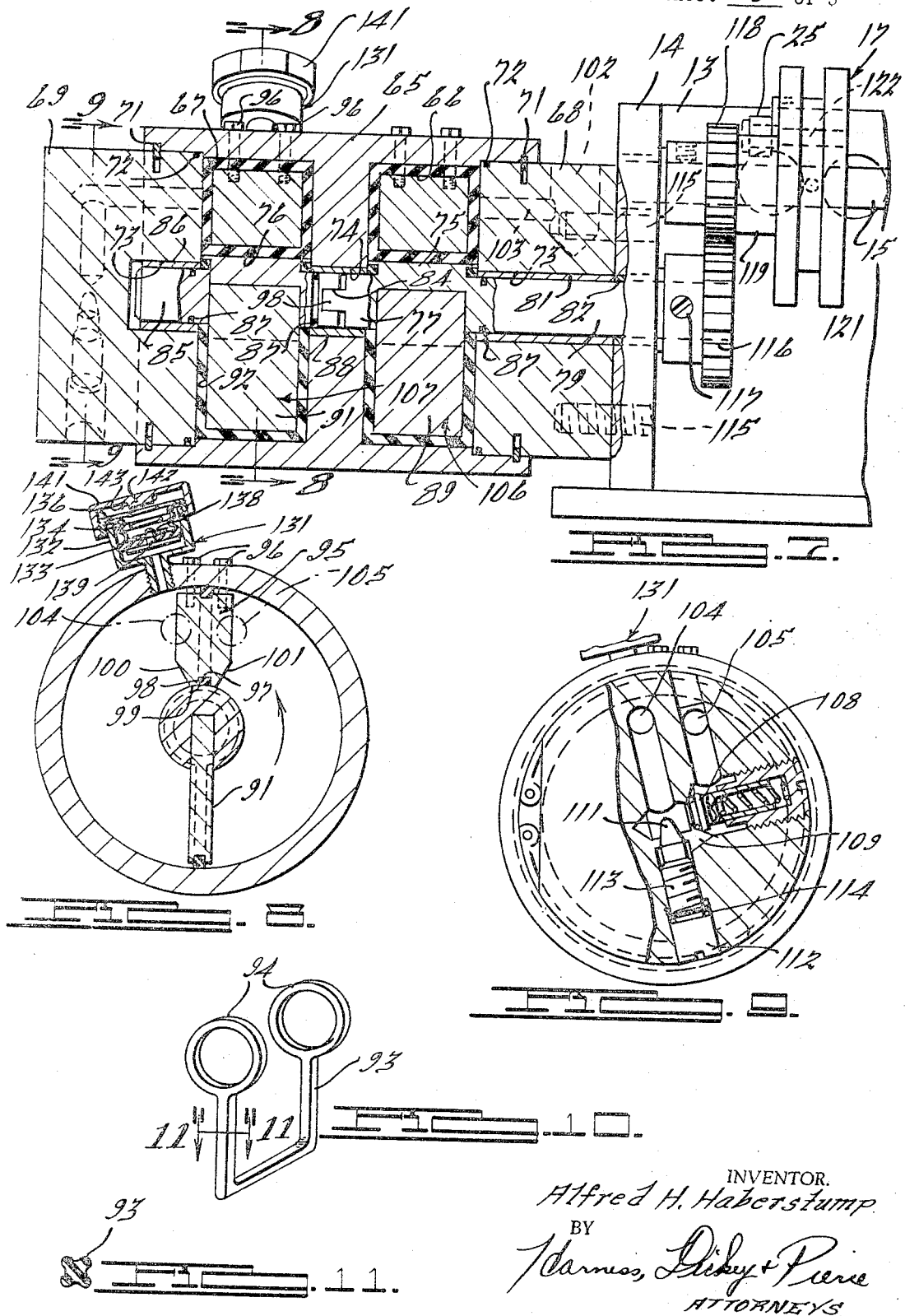

3,428,085
FLUID CONTROLLED AIR ACTUATED
SEQUENCE DEVICE
Alfred H. Haberstump, 15125 Piedmont Ave.,
Detroit, Mich. 48223
Filed Oct. 23, 1965, Ser. No. 503,641
U.S. Cl. 137—624.2
Int. Cl. G05b *19/06;* F15b *21/02;* G05g *21/00*
6 Claims

ABSTRACT OF THE DISCLOSURE

Various machine operations are controlled in sequence by the device of the present invention. A shaft with adjustable cams thereon is rotated exactly 360° by a reversible air motor which also drives a liquid motor, the flow of fluid from which is controlled to regulate the speed of operation of the air motor in one direction of operation. The motors are returned to their initial position while the shaft and cam are retained stationary.

---

The device of the present invention has a support for a plurality of signal elements such as valves to be actuated in a predetermined sequence. Cams are mounted on a shaft for individual adjustment to vary the timing sequence between machine operations without affecting the timing of other machine operations. An air motor operates a freely rotatable pinion on the cam supporting shaft which has a hub containing a detent which engages a pawl on the shaft for rotating the shaft and cams through 360°. The advancement of the air motor is controlled by the resistance of escaping liquid from a liquid motor which is regulated by an adjustable needle valve which thereby controls the speed of operation of the air motor. In one arrangement the air and liquid motors may be rams having reciprocating piston rods so arranged that the advancement of the air motor piston rod is controlled by the discharge of liquid from the liquid motor produced by the movement of its piston rod by the air motor. The piston rods operate a pair of racks having teeth in engagement with the teeth of the freely rotatable pinion. Another embodiment of the air and liquid motors comprises a case having a pair of adjacent cylinders therein. A shaft is rotatably mounted in the center of the case with a vane for each cylinder affixed thereto so that the displacement of the liquid in the liquid cylinder controls the speed of advancement of the vane in the air cylinder. The shaft drives a pinion having teeth in engagement with those of the freely floating pinion, the ratio between the teeth of which produces 360° rotation of the shaft and the cams carried thereby.

Accordingly, the main objects of the invention are: to provide adjustable cams on a cam shaft for sequentially engaging air valves driven through 360° rotation by an air motor controlled by discharge of liquid from a liquid motor actuated thereby; to provide a plurality of adjustable cams on a cam shaft for operating control elements in adjustable preselected sequence through 360° cycles by the rotation of a freely rotatable pinion having a detent engageable by a pawl on the cam shaft which permits the retraction of the pinion without affecting the position of the cams; to drive a cam shaft by an air motor the advancement of which is controlled by the escape of liquid from a liquid motor which is actuated by the air motor, and in general, to provide a control mechanism which is simple in construction, positive in operation and economical of manufacture.

Other objects and features of novelty of the invention will be specifically pointed out or will become apparent when referring for a better understanding of the invention, to the following description taken in conjunction with the accompanying drawings, wherein:

FIG. 1 is a broken plan view, with parts in section, of a control device containing features of the present invention;

FIG. 2 is a sectional view of the structure illustrated in FIG. 1, taken on the line 2—2 thereof;

FIG. 3 is a sectional view of the structure illustrated in FIG. 2, taken on the line 3—3 thereof;

FIG. 4 is a broken sectional view of the structure illustrated in FIG. 1, taken on the line 4—4 thereof;

FIG. 5 is a broken sectional view of the structure illustrated in FIG. 4, taken on the line 5—5 thereof;

FIG. 6 is an end view of structure, similar to that illustrated in FIG. 3, showing a different drive for the cams thereof;

FIG. 7 is a sectional view of the motor of the device illustrated in FIG. 6;

FIG. 8 is a sectional view of the structure illustrated in FIG. 7, taken on the line 8—8 thereof;

FIG. 9 is a sectional view of the structure illustrated in FIG. 7, taken on the line 9—9 thereof;

FIG. 10 is a perspective view of a seal employed about the vanes in the motor of the device illustrated in FIG. 7, and FIG. 11 is a sectional view of the structure illustrated in FIG. 10, taken on the line 11—11 thereof.

Referring to FIGS. 1 to 5 inclusive, the device of the present invention embodies a housing 10 comprising a base 11 and a cover 12. The base supports an upright plate 13 and forwardly extending plates 14 disposed in unit relation to each other. A shaft 15 is mounted in sleeve bearings 16 in the plates 14 for rotation therein. The shaft supports any number of cam supporting elements 17 herein illustrated as four in number. An annular driving element 18 is secured to the shaft 15 by a set screw 19. A pinion gear 21 and its hub extension 22 carry a bearing sleeve 23 which is freely rotatable upon the shaft 15. The hub 22, as illustrated more specifically in FIG. 3, has a notch 24 therein forming a detent with which a pawl 25 is received. The pawl is pivotally mounted on a shouldered screw 26 which is secured to the driving element 18. The pawl rides on the periphery of the hub when the gear rotates clockwise and is engaged by the detent when the gear is driven counterclockwise.

A pair of cylinders 28 and 29 have cylindrical extensions 31 which extend through apertures 32 in the plate 13 to be supported thereby. The cylinder 28 has a piston rod 33 carrying a piston 34 while the cylinder 29 has a piston rod 35 carrying a similar piston 34. Each of the piston rods 33 and 35 carry a rack supporting head 36 which supports racks 37 and 38 with the teeth thereof mated with the teeth of the pinion gear 21. The cylinder 28 has an inlet port 41 and an outlet port 42 while the cylinder 29 has only an outlet port 43. A four-way valve 44 controls the flow of air to and from the ports 41 and 42. When air is introduced through the port 41, the piston 34 is advanced to the right, as illustrated in FIG. 3, carrying the rack 37 forwardly therewith. This rotates the pinion 21 counterclockwise carrying the pawl 25 and the driving element 18 along therewith. The pinion gear 21 actuates the rack 38 which moves the piston rod 35 into the cylinder 29 and thereby moves the liquid contained therein outwardly of the port 43. The liquid leaving the port 43 passes through an elbow 45 through a control valve 46, through a conduit 50 to the opposite end of the cylinder and also into a reservoir 47. The reservoir contains a piston 48 which is backed up by a spring 49. The control valve 46 has a knob 51 by which a needle valve is adjusted to control the rate of flow of the liquid from the port 43 and thereby control the speed of movement of rod 35 into the cylinder 29. A bypass valve, not illustrated, is provided within the control valve 46 to permit the free flow of the liquid from the cylinder through the conduit 50 and from the reservoir 47 back into the opposite end of the cylinder 29. The reservoir receives the excess liquid present when the liquid is moved into the piston rod end of the cylinder. When air is admitted through the port 41 the piston rod 33 has its rate of advancement controlled by the passage of the liquid from the cylinder 29 regulated by the valve 46. In this manner the speed of rotation of the shaft 15 and the advancement of the cams on the cam elements 17 through one complete 360° circle of rotation is accurately controlled. It will be noted that a pair of apertures 53 are provided through the plate 13 for supporting and guiding the free end of the racks 37 and 38.

Each of the camel elements 17, illustrated more specifically in FIGS. 4 and 5, comprise a pair of washers 54 having peripheral flanges 55 facing each other when mounted on a washer-like element 62. This separates the washers 54 and provides a space 56 between the flanges forming an annular slot in which a bolt 57 may be moved. The bolt supports a cam 58, a pair being mounted on each of the cam elements 17 one extending from one side and the other from the other side. The cams 58 are aligned with air valves 59 or other signal elements which are mounted in apertures in the plate 13. It will be noted that a pair of the valves 59 are provided for each of the cam elements 17 each aligned with a cam 58 which engages a ball or plunger 61 of a valve during the cam's advancement. With this arrangement, each of the cams 58 is adjustable on its element 17 so that each of the valves 59 can be operated in any sequence relative to the other valves. The washer element 62 has a set screw 63 by which the cam elements 17 are fixed to the shaft 15. When the device is employed for controlling operations of elements of a machine, each operation may be accurately adjusted without interfering with the settings of other elements of the machine. The initial settings are preferably made with the motor operating at slow speed.

One complete operation of the shaft 15 through 360° operates all of the valves 59 in a predetermined sequence. If any of the valves 59 produce an operation earlier or later than desired, the simple adjustment of the cam 58 will accurately time the operation without interfering with the timing of the operations occurring prior thereto or thereafter. When the valve 44 is operated, air is introduced through to the port 41 and the piston rod 33 will be advanced to the right, as illustrated in FIG. 3. This rotates the pinion gear 21, the pawl supporting and driving element 17, the shaft 15 and the cam supporting elements 17. The rack 38 will be operated by the pinion 21 moving the piston rod 35 within the cylinder 29 and the liquid from the outlet port 43 through the regulating valve 46 into the opposite end of the cylinder and the reservoir 47. Adjustable stop means may be provided for stopping the advancing movement of the piston rod 33 at the exact moment that the shaft 15 and cam supporting elements 17 have completed a 360° rotation. The piston is herein illustrated as being stopped by the cylinder head. Thereafter, the valve 44 is shifted to its initial position admitting air through the port 42 for returning the piston 34 to the left. This rotates the pinion gear 21 counterclockwise and disengages the hub 22 from the pawl 25 until the hub has rotated 360° whereupon the pawl 25 will drop within the notch 24 as illustrated in FIG. 3 in position to repeat the cycle. The return movement of the rack 38 to the right moves the piston on the rod 35 toward the right in the cylinder 29 and the liquid which has been moved into the cylinder end and the reservoir 47 will return to the opposite end of the cylinder. A one-way valve in the valve 46 will be opened by the flow of returning fluid and a rapid return of the pistons to their initial positions will occur. This flow of liquid without restriction is aided by the tension of the spring 49 urging the piston 48 toward the outlet end of the reservoir.

Referring to FIGS. 6 to 11, a further form of operating motor for the shaft 15 is illustrated. A body 65 has cylindrical apertures 66 and 67 therein closed by heads 68 and 69 forming sealed cylindrical chambers. Spring rings 71 extend into slots in the heads and body 65 to secure the heads in firm fixed positions sealed by O-rings 72. Apertures 73 in the heads are aligned with an aperture 74 in the wall between the cylindrical apertures 66 and 67. Cylindrical bodies 75 and 76 are mounted centrally of the apertures 66 and 67, the body 75 having an extending shaft section 77 with a tongue 78 on the end thereof. The opposite end of the body 75 has a drive shaft 79 supported in a sleeve bearing 81 within the aperture 73 of a head 78 and in a sleeve bearing 82 in an aperture in the end plate 14. The cylindrical body 76 has a stub shaft 83 containing a slot 84 into which the tongue 78 on the stub shaft 77 extends. The opposite end of the body has a stub shaft 85 thereon mounted within a sleeve bearing 86 and sealed thereto by an O-ring 87. The stub shafts 77 and 83 are mounted within a sleeve bearing 88 in the aperture 74 to which the stub shaft 83 is sealed by an O-ring 87. Similarly, an O-ring 87 seals the drive shaft 79 to the seleeve bearing 81. A vane 89 is secured in a slot in the cylindrical body 75 and a vane 91 is secured in a slot in the cylindrical body 76. A slot 92 is provided about the three extending edges of the vanes and about the ends of the bodies 75 and 76 for the reception of a sealing element 93 illustrated in FIG. 10. The sealing element is made of neoprene or like sealing material which has a fluted configuration, as illustrated in FIG. 11. The seal is U-shaped to enter the slot 92 in the edge of the vanes terminating in two ring sections 94 which extend within the annular slots in the end of the bodies 75 and 76.

A partition 95 is secured within each of the cylindrical apertures 66 and 67 by a plurality of screws 96. The partition has a slot 97 around its central area which receives a sealing ring 98 which is substantially square in configuration, as illustrated in FIG. 7. The inner end of the partition is arcuately shaped at 99 and the adjacent sides are sloped at 100 and 101 to be parallel to the sides of the vane when the vane has been advanced thereagainst or retracted into engagement therewith. A pair of spaced inlet ports 102 are connected by passageways 103 to opposite sides of the partition 95 in the cylindrical recess 66. When air is admitted through one passage to one side of the vane it will be moved from engagement with the sloping wall portion 100 and advanced against the wall portion 101. When air is admitted to through the other passageway the vane will be moved back against the wall portion 100. It will be noted from FIG. 8 that the inlet and outlet passageways communicate with the space between the side of the partition and the vane. A pair of passageways 104 are provided in the head 69 in communication with the space on either side of the partition 95 with the cylindrical aperture 67, the motors in each of the apertures 66 and 67 being identical.

The motor 106 within the cylindrical apertures 66 is actuated by air from the ports 102 and passageways 103. The motor 107 formed in the cylindrical aperture 67 is of the liquid type for restraining and controlling the operation of the air motor 106. The restraining motor 107 and the passageways associated therewith are completely filled with liquid so that when the vane 91 is driven by the air motor 106, liquid will be forced from the passageway 105 past the one-way valve 108 through a passageway 109 past the needle valve 111 to the outlet passage 104 on the opposite side of the vane 91. When the air motor 106 is returned to its initial position, the vane 91 will move the liquid through the passageway 104, past the valve 108 through the passageway 105 without restriction permitting a fast return of the motor vanes to their original positions. The needle valve 111 has a head 112 by which the valve is turned on the threads 113 to adjust the end forward and rearwardly. The head 112 is sealed by an O-ring 114 to the wall of the aperture in the head 69 in which it extends.

The head 68 is secured to the plate 14 by a plurality of screws 115. The shaft 79 has a gear 116 secured thereon by a set screw 117. The gear 116 has its teeth in mesh with those of a gear 118 having a hub 119 containing a detent 24. The gear 118 and hub 119 have a bearing sleeve 121 which permits the gear and hub to freely rotate on the shaft 15. The adjacent cam element 17 has the pawl 25 secured thereto by a screw 122. The pawl 25 is urged by a spring 123 into engagement with the detent 24 in the hub 119. The pawl and detent function to drive the shaft 15 along with the cam elements 17 in rotation to operate the plurality of valves 59 in sequence in the same manner as pointed out hereinabove with regard to the structure of FIGS. 1 to 5 inclusive. When air is introduced into one of the ports 102 by shifting the four-way valve 44, the air will be delivered on the left hand side of the vane 89 which will be advanced counterclockwise into engagement with the sloping wall 101 of the partition 95. The gear 116 is so related to the gear 118 that during its rotation of less than 360°, a rotation of exactly 360° will be produced to the shaft 15 and the cam supporting elements 17. The movement of the vane 89 will produce a similar movement to the vane 91 of the restricting motor 107, which will advance the liquid in front of the vane through the aperture 105, past the relief valve 108, through the needle valve 111 and out the passageway 104 to the rear of the vane 91. The setting of the needle valve 111 is such that the speed of operation of the drive shaft 79 is regulated to produce a predetermined timed cycle for the rotation of all of the cams 58 past the valves 59. After this 360° rotation of the shaft 15, the valve 44 is returned to its initial position admitting air through to the other port 102 and passageway 103 to the opposite side of the vane 89. The vane 89 will move clockwise back to its initial position against the sloping surface 100. The air ahead of the vane 89 moves out of the aperture 66 through the other of the passageways 103 and ports 102. During the return movement of the vane 91, the liquid will be moved into the passageway 104 through the check valve 108 and to directly pass to the opposite side of the vane without any restriction so that both of the vanes 89 and 91 can be returned to their initial positions in a rapid manner. Upon the return movement of the motors, the shaft 15 and the cam supporting elements 17 will be retained stationary as the pawl 25 rides upon the peripheral surface of the hub 119. At the end of the return movement, the pawl 25 will drop within the notch or detent 24 in position to again advance the shaft 15 and cam elements 17 through another 360° upon the operation of the air motor 106 controlled by the liquid motor 107. The shaft 79 rotates approximately 300°, and as pointed out above, the gear 116 is so related to the gear 118 that the shaft 15 rotates 360° each operation of the device.

It will be noted in FIG. 1 that at the end of the operation a leaf spring 125 secured to the end plate 14 adjacent to the driving element 18 engages a notch 126 on the periphery of the element at the end of the 360° rotation thereof. This provides a positive stop which prevents the reverse rotation of the element when the pinion gear 21 is returned to its initial position. In FIG. 1 a stop disk 127 is also shown in dot and dash line having a notch 126 therein engaged by a leaf spring 125 fastened on the other plate 14. This arrangement is employed on the structure of FIG. 7 which illustrates the pawl 25 as being secured directly on a cam supporting element 17 instead of an element 18.

The valves 59 may be of a ball check type wherein the deflection of the ball or plunger 61 increases or decreases the air in a conduit 128. The change of air pressure in the conduit 128 produces the operation of a four-way valve which introduces fluid to cylinders, motors, or the like devices for producing a machine operation. These operations will follow each other with extreme accuracy and within a predetermined time cycle. It is to be understood that any microdevice which can produce a signal such as an electric current or impulse when actuated by a cam 58 may be substituted for the valves 59. To make certain that a full charge of liquid is provided within the liquid motor chamber, a reservoir 131 communicates with the chamber on the side adjacent to the port 104. The reservoir has a cup-like body 132 containing a sealing washer 133 having a bellows extension 134 which is sealed to the top of the cup-like element 132 by an annular sealing element 136 which is threaded on the end thereof. A metal disc 137 is secured to the underface of the sealing washer 133 by a nut 138 threaded on a stud 139 of the disc. A cap 141 is threaded upon the annular sealing element 136 having an extension 142 which centers a spring 143 which is also centered about the nut 138 for the purpose of exerting a downward pressure on the washer 133. This pressure can be changed by the upward or downward movement of the cap 141 on the sealing element 136. Should any leakage occur to the liquid within the liquid motor chamber, it will be replaced from the reservoir so that a full charge of liquid can be assured within the motor chamber at all times.

What is claimed is:

1. In a control device, a shaft, a plurality of cam elements secured to said shaft, cams adjustably positioned on said cam elements, signal means aligned with said adjustable cams, a pawl carried by said shaft, a driving gear rotatable on and relative to said shaft having a detent engageable by said pawl, reversible air motor means for driving said gear in a direction to positively drive said shaft through said pawl from the same starting point each rotation of the shaft, liquid motor means driven by said air motor means for controlling the drive of the latter, and means for reversing the air motor means to return both motor means to their initial position.

2. In a control device, a shaft, a plurality of cam elements secured to said shaft, cams adjustably positioned on said cam elements, signal means aligned with said adjustable cams, a pawl carried by said shaft, a driving gear rotatable on and relative to said shaft having a detent engageable by said pawl, an air motor for driving said gear in a direction to positively drive said shaft through said pawl from the same starting point each rotation of the shaft, a liquid motor driven by said air motor for controlling the drive of the latter, a circuit from said liquid motor, and means in said circuit for varying the area and flow therethrough for controlling the speed of operation of the air motor, said air motor being a ram containing a piston with ports on each side thereof and said liquid motor being a ram having an outlet port.

3. In a control device, a shaft, a plurality of cam elements secured to said shaft, cams adjustably positioned on said cam elements, signal means aligned with said adjustable cams, a pawl carried by said shaft, a driving gear rotatable on and relative to said shaft having a detent engageable by said pawl, an air motor for driving said gear in a direction to positively drive said shaft through said pawl from the same starting point each rotation of the shaft, a liquid motor driven by said air motor for controlling the drive of the latter, a circuit from said liquid motor, means in said circuit for varying the passage and flow therethrough for controlling the speed of operation of the air motor, said air motor being a ram containing a piston with ports on each side thereof and said liquid motor being a ram having an outlet port, and a pressure reservoir for receiving the liquid from said outlet port.

4. In a control device, a shaft, a plurality of cam elements secured to said shaft, cams adjustably positioned on said cam elements, signal means aligned with said adjustable cams, a pawl carried by said shaft, a driving gear rotatable on and relative to said shaft having a detent engageable by said pawl, an air motor for driving said gear in a direction to positively drive said shaft through said pawl from the same starting point each rotation of the shaft, a liquid motor driven by said air motor for controlling the drive thereof, a circuit from said liquid motor, means in said circuit for varying the passage and flow therethrough for controlling the speed of operation of the air motor, said air motor being a ram containing a piston with ports on each side thereof and said liquid motor being a ram having an outlet port, a pressure reservoir for receiving the liquid from said outlet port, and a check valve in the circuit opened by the return flow of the liquid from the reservoir.

5. In a control device, a shaft, a plurality of cam elements secured to said shaft, cams adjustably positioned on said cam elements, signal means aligned with said adjustable cams, a pawl carried by said shaft, a driving gear rotatable on and relative to said shaft having a detent engageable by said pawl, an air motor for driving said gear in a direction to positively drive said shaft through said pawl between the same start and stop positions each time the shaft is rotated, a liquid motor driven by said air motor for controlling the drive thereof, a circuit from said liquid motor, means in said circuit for varying the passage and flow therethrough for controlling the speed of operation of the air motor, said air motor being a ram containing a piston with ports on each side thereof and said liquid motor being a ram having an outlet port, a pressure reservoir for receiving the liquid from said outlet port, a check valve in the circuit opened by the return flow of the liquid from the reservoir, and means preventing the reverse rotation of said cam element shaft when the air motor is reversed.

6. In a control device, a shaft, a plurality of cam elements secured to said shaft, cams adjustably positioned on said cam elements, signal means aligned with said adjustable cams, unidirectional drive means including a driving gear rotatable on and relative to said shaft for driving said shaft, and means for driving said unidirectional drive means in one direction for positively rotating said shaft through 360° between the same start and stop positions each time the shaft is rotated, means for returning said drive means to its initial position, holding means for preventing the return movement of said shaft when said drive means is returned to its initial position, said driving means embodying an air motor, a liquid motor driven by said air motor, and means controlling the flow of liquid from said liquid motor for regulating the speed of operation of both said motors.

References Cited

UNITED STATES PATENTS

| | | | |
|---|---|---|---|
| 897,676 | 9/1908 | Thompson | 92—12 |
| 1,653,172 | 12/1923 | Hammond | 92—12 |
| 2,613,649 | 10/1952 | Diebel | 92—8 |
| 2,907,550 | 10/1959 | Heinish | 91—347 |
| 2,946,346 | 7/1960 | Mead | 137—624.17 |
| 3,053,232 | 9/1962 | Self | 92—12 |
| 3,064,628 | 11/1962 | Canalize et al. | 92—12 |
| 3,094,902 | 6/1963 | Riopelle | 92—12 |

OTHER REFERENCES

Flick Reedy Corporation, Miller Fluid Power Division; Hydraulic Cylinders; p. 28; JH–104N; Mar. 17, 1959.

PAUL E. MASLOUSKY, *Primary Examiner.*

U.S. Cl. X.R.

251—230; 91—186, 462; 92—12, 125, 136